United States Patent [19]

Merrill

[11] 4,020,031
[45] Apr. 26, 1977

[54] POLY(ARYLENE SULFIDE) COATING COMPOSITIONS CONTAINING ALKALI METAL ALKYLBENZENESULFONATE

[75] Inventor: R. F. Merrill, Bartlesville, Okla.

[73] Assignee: Phillips Petroleum Company, Bartlesville, Okla.

[22] Filed: Sept. 15, 1975

[21] Appl. No.: 613,668

[52] U.S. Cl. .................... 260/29.2 R; 260/33.4 R; 260/31.8 R; 260/33.6 R; 260/33.8R; 260/79; 260/79.1; 427/375; 427/385 B; 428/419
[51] Int. Cl.$^2$ .......................................... C08J 3/06
[58] Field of Search ............... 260/29.2 R, 79, 79.1; 427/375, 385; 428/419

[56] References Cited

UNITED STATES PATENTS 3,205,203  9/1965  Swaab et al. ................ 260/29.2 R
3,856,735  12/1974  Blackwell ............................ 260/79

Primary Examiner—Melvyn I. Marquis

[57] ABSTRACT

A composition comprising at least one poly(arylene sulfide) resin and at least one alkali metal alkylbenzenesulfonate is employed to coat a surface of a substrate. The coating can be heated to fuse and cure the resin.

31 Claims, No Drawings

POLY(ARYLENE SULFIDE) COATING COMPOSITIONS CONTAINING ALKALI METAL ALKYLBENZENESULFONATE

This invention relates to an improved poly(arylene sulfide) coating composition, a method of coating a substrate with this composition, and the resulting coated article.

Arylene sulfide polymers are ideally suited for coating a wide variety of articles because of the high temperature stability of such polymers and their ability to withstand chemical attack. These polymers are particularly well suited for coating equipment such as pump impellers, agitator blades, valve parts and the interior of conduits which are used in handling corrosive fluids. These polymers also have great potential in the coating of various items of cookware such as baking pans, skillets, and the like, because food does not stick to the cured polymeric surface.

It has been found that the type of wetting agent or surfactant used in the poly(arylene sulfide) coating formulations has an important effect on the quality of the coating on metals, ceramics and other high temperature stable substrates. Many of the surfactants result in the coating surface being relatively rough and having a large number of pinholes and fish eyes. Although nonionic surfactants such as alkylphenoxypoly(ethoxy) alcohols have been employed in commercially utilized poly(arylene sulfide) coating compositions with generally satisfactory results, the resulting coatings have a surface which is undesirably rough for many applications.

It has now been discovered that the use of an alkali metal alkylbenzenesulfonate in the poly(arylene sulfide) coating composition provides a surprising superior coating surface, substantially free from blemishes, pinholes, fish eyes and other surface irregularities.

Accordingly, it is an object of the invention to provide a new and improved poly(arylene sulfide) coating composition. Another object of the invention is to provide a poly(arylene sulfide) coating having an improved surface finish. Another object of the invention is to reduce the surface irregularities in a poly(arylene sulfide) coating. Other objects, aspects and advantages of the invention will be apparent from a study of the specification, the drawing and the appended claims to the invention.

The term "poly(arylene sulfide)" as used in this specification is intended to include polymers of the type which are prepared as described in U.S. Pat. No. 3,354,129, issued Nov. 21, 1967, to Edmonds and Hill. As disclosed in that patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedure of this invention, because of their high thermal stability and availability of the materials from which they are prepared, are those polymers having the repeating unit —R—S— where R is phenylene, biphenylene, naphthalene, biphenylene ether or a lower alkyl-substituted derivative thereof. By "lower alkyl" is meant alkyl groups having 1 to 6 carbon atoms, for example methyl, propyl, isobutyl, n-hexyl, and the like. The preparation of such polymers is disclosed in the above patent of Edmonds et al, the disclosure of which is incorporated herein by reference.

The polymers which are used for coatings in this invention are those normally solid resins which have melting temperatures above about 200° C. These arylene sulfide polymers preferably have a melting temperature in the range from about 200° C. to about 425° C. Polymers of phenylene sulfide normally have melting temperatures in the range from about 280° C. to 375° C. The preferred polymers have an inherent viscosity in chloronaphthalene at 206° C. of at least 0.1, more preferably between 0.1 and 0.3, and ideally between 0.13 and 0.23, as such polymers have been found to form very adherent, uniform coatings which are superior for the uses mentioned above.

The anionic surfactant which is employed in the poly(arylene sulfide) coating composition in accordance with the present invention is at least one alkali metal alkylbenzenesulfonate. The alkali metal alkylbenzenesulfonates can be represented by the formula

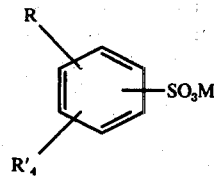

wherein M is an alkali metal, R is an alkyl radical having 6 to 30 carbon atoms, preferably 8 to 18 carbon atoms, and each R' is individually selected from the group consisting of hydrogen and alkyl radicals having 1 to 18 carbon atoms, preferably 1 to 4 carbons. In general two, and preferably at least three of the R' radicals will be hydrogen. In the presently preferred embodiment, all four of the R' radicals are hydrogen. The R radical can be a linear alkyl radical or a branched alkyl radical. The alkali metal can be lithium, sodium, potassium, rubidium, or cesium, but sodium is presently preferred.

The R radical can be in the ortho, meta or para position to the sulfonate group. Individual compounds, as well as isomeric mixtures of the particular alkali metal alkylbenzenesulfonate, and mixtures of two or more types of alkali metal alkylbenzenesulfonate can be employed. One of the commercially available sources of alkali metal alkylbenzenesulfonates is the petroleum sulfonates, which can be employed in the crude state where the unsulfonated oil is still present or in the refined state obtained by removing most, if not all, of the unsulfonated oil. Examples of suitable alkali metal alkylbenzenesulfonate include sodium p-hexylbenzenesulfonate, sodium p-octylbenzenesulfonate, lithium p-decylbenzenesulfonate, sodium p-dodecylbenzenesulfonate, potassium m-hexadecylbenzenesulfonate, rubidium p-octadecylbenzenesulfonate, sodium p-eicosylbenzenesulfonate, sodium p-tetracosylbenzenesulfonate, lithium o-triacontylbenzenesulfonate, sodium o-dodecylbenzenesulfonate, sodium m-dodecylbenzenesulfonate, lithium p-dodecylbenzenesulfonate, potassium p-dodecylbenzenesulfonate, lithium o-dodecylbenzenesulfonate, potassium o-dodecylbenzenesulfonate, sodium 2-methyl-4-dodecylbenzenesulfonate, potassium 2-ethyl-4-pentadecylbenzenesulfonate, sodium 2,4-didodecylbenzenesulfonate, lithium 3-isobutyl-4-pentadecylbenzenesulfonate, potassium 2-propyl-4-dodecylbenzenesulfonate, sodium 2,5-dimethyl-4- dodecylbenzenesulfonate, sodium p-isooctylbenzenesulfonate, and the like, and mixtures thereof. The presently preferred alkali metal alkylbenzenesulfonate are the commercially available products designated sodium dodecylbenzenesulfonate, which generally are a mixture in which the alkyl group has an average of 12 to 13 carbon atoms, with the para position isomers being dominant.

The alkali metal alkylbenzenesulfonate will generally be employed in an amount in the range of 0.01 to 10 weight percent, preferably in an amount in the range of 0.1 to 7 weight percent, more preferably in the range of about 0.5 to about 5 weight percent, based on the weight of the poly(arylene sulfide) resin employed in the coating composition. The alkali metal alkylbenzenesulfonate can be admixed with the poly(arylene sulfide) resin in any suitable manner, preferably by mixing finely divided particles of the resin with the liquid alkali metal alkylbenzenesulfonate in the presence of a diluent. The slurry can be prepared in any suitable manner; for example, by blending the ingredients in a suitable mixing device such as an intensive blender or a ball mill, at room temperature for a period in the range of 30 minutes to 24 hours.

Any liquid can be used as the diluent provided the liquid is inert to the other components of the slurry and to the substrate, and provided it is readily volatilized prior to or during the subsequent heating or curing step. The diluents presently preferred are water and ethylene glycol. Other diluents which can be used include alcohols such as methyl alcohol, ethyl alcohol, and isopropyl alcohol, and hydrocarbons such as benzene, toluene, heptane, cyclohexane, and various hydrocarbon mixtures such as kerosene, diesel fuel, and the like. Less preferred diluents which can be used include chlorinated biphenyl, dimethyl phthalate, and the like. Mixtures of the diluents can be used.

The particle size of the polymer can vary considerably and the most desirable particle size for a particular application can be easily determined in a relatively few trials. This can vary from the finest powders available up to about 150 microns in particle size. Good results can be obtained with the polymer in a particle size of about 3 to 30 microns, although the invention can be satisfactorily practiced with polymers of particle size outside this range.

The concentration of the polymer in the carrier liquid depends upon the coating application and whether or not additional solids are employed. As a practical matter, the slurry should not be so dilute that the polymer particles are not closely enough associated on deposit on the surface to permit them to fuse together on melting. On the other hand, the thickness of the slurry and its ease of application will impose a practical upper limit on the solids concentration. Generally a solids content of about 10 to about 65 weight percent can be used and best results are obtained with a slurry that contains about 25 to about 40 weight percent solids based on the weight of the total slurry. In addition to the poly(arylene sulfide) and surfactant, other materials can be incorporated into the slurry, such as fillers, pigments and similar coloring agents, and the like. Suitable fillers include polytetrafluoroethylene, carbon black, bentonite, titanium dioxide, iron oxide, moylbdenum disulfide, and the like, and mixtures thereof.

Any surface that can be heated to the coating temperature necessary to fuse the polymer can be coated with the procedure of this invention. In general, the articles which are coated are those in which the surfaces are formed of thermally stable polymeric materials or substances such as metal, glass, ceramic or stone. Preferably, metals such as aluminum, iron, iron alloys, steel, titanium, chromium, and the like are used. Preparation of the surface to be coated need only include a suitable cleaning to remove the scale, dirt and grease.

After the coating has been applied and the polymer fused, it is desirable to cure the coating by continued heating at a suitable elevated temperature, preferably in the range of about 260° C. to 375° C., in an oxygen-containing atmosphere, for example air, for about 5 minutes to 6 hours or more, preferably about 370° C. for 30 minutes to 1 hour. The thickness of the coating can be increased by additional applications following the same procedure after each curing period. Coating thicknesses of about 0.0125 to 1.25 mm can easily be applied. Coatings having thicknesses of about 0.025 to 0.75 mm are satisfactory for most uses. The slurry can be applied by any procedure such as by spraying the slurry onto a surface, which may be hot to quickly evaporate the carrier liquid, or flowing the slurry over the article, preferably while providing for escape of the vaporized solvent.

The following examples are presented in further illustration of the invention, but should not be unduly construed as limitations thereof.

EXAMPLE I

Slurries were prepared by ball milling overnight (about 15 hours) 30 parts by weight of uncrosslinked poly(phenylene sulfide), 10 parts by weight $TiO_2$, 59 parts by weight of water, and 1 part by weight of the surfactant to be tested. The uncrosslinked poly(phenylene sulfide had an inherent viscosity of 0.16 in chloronaphthalene at 206° C., and a melt flow of greater than 3000 g/10 minutes (ASTM D 1238-70, using 5 Kg weight at 280° C.). Cleaned and "degreased" 7.65 × 12.7 cm coupons of aluminum were spray coated to determine the effectiveness of each wetting agent. The coated coupons were cured at 371° C. for 30 minutes. A visual examination, an examination at 20X enlargement and an examination for pinholes by means of a Tesla coil were made. The results are summarized below:

Table I

| Run | Surfactant Used | Type | Coating Thickness | Surface Properties of Coating |
|---|---|---|---|---|
| 1 | Petroleum Sulfonate A[a] | anionic | 2 mils | Virtually pinhole free, small surface irregularities, very few fish eyes. |
| 2 | Petroleum Sulfonate B[b] | anionic | 2.5 mils | Virtually pinhole free. Very few surface irregularities, 1–2 fish eyes. |
| 3 | Octylphenoxy-poly(ethoxy) | non anionic | 2.5 mils | Numerous fish eyes, numerous pinholes, some surface |

Table I-continued

| Run | Surfactant Used | Type | Coating Thickness | Surface Properties of Coating |
|---|---|---|---|---|
| | ethanol[c] | | | irregularities. |

[a]TRS-10-395 (Witco Chemical Co.) sodium salt of sulfonated alkyl aromatic oils, average equivalent weight 395, predominantly sodium alkylbenzene-sulfonate.
[b]TRS-10-410 (Witco Chemical Co.) sodium salt of sulfonated alkyl aromatic oils, average equivalent weight 418, predominantly sodium alkylbenzene-sulfonate.
[c]Triton-X-100 (Rohm & Haas).

The data show that the anionic petroleum sulfonates make excellent surface coatings compared to the nonionic material which has been used routinely in the coating formulations.

EXAMPLE II

Slurries were prepared by ball milling overnight (about 15 hours) 44 parts by weight of the uncrosslinked poly(phenylene sulfide) described in Example I, 54.9 parts by weight of water, and 1.1 parts by weight of the surfactant to be tested. Cleaned and "degreased" 7.65 × 12.7 cm coupons of aluminum were spray coated to determine the effectiveness of each wetting agent. The coated coupons were cured at 371° C. for 30 minutes. A visual examination, an examination at 20X enlargement and an examination for pinholes by means of a Tesla coil were made. The results are summarized below:

Table II

| Run | Surfactant Used | Coating Thickness | Surface Properties |
|---|---|---|---|
| 1 | Sodium-N-methyl-N-palmitoyl taurate[a] | 2 mil | Many pinholes, poor surface, many fish eyes. |
| 2 | Sodium alkylnaphthalene-sulfonate[b] | 2 mil | Many pinholes, poor surface, many fish eyes. |
| 3 | Sodium dodecylbenzene-sulfonate[c] | 2 mil | Few pinholes and fish eyes, small irregularities. |
| 4 | Sodium dodecylbenzene-sulfonate[c] | 5 mil | Pinhole free, few fish eyes, small irregularities. |
| 5 | Sodium dodecylbenzene-sulfonate[c] | 7.5 mils | Pinhole free - no fish eyes, small surface irregularities. |

[a]Igepon TN-74 (GAF Corp.).
[b]Nekal NF (GAF Corp.).
[c]Conoco Sulfonic Acid 597 (Continental Oil Co., Ponca City, Okla.) neutralized with NaOH.

The above data show that not all anionic surfactants provide adequate surfaces but that sodium dodecylbenzene sulfonates can be used effectively as surfactant in poly(phenylene sulfide) coating formulations.

EXAMPLE III

Slurries were prepared by adding 40 parts by weight of the uncrosslinked poly(phenylene sulfide) described in Example I to 60 parts by weight of an aqueous solution of the surfactant to be tested. Cleaned and "degreased" 7.65 × 15.3 cm coupons of aluminum were spray coated with a 2 mil thick coating to determine the effectiveness of each wetting agent. The coated coupons were cured at 371° C. for 30 minutes. A visual examination, an examination at 20X enlargement and an examination for pinholes by means of a Tesla coil were made. The results are summarized below:

Table III

| Run | Surfactant[d] | Surface Properties |
|---|---|---|
| 1 | 2 wt. % Octylphenoxy-poly(ethoxy)-ethanol[a] | Rough surface, many pinholes and fish eyes. |
| 2 | 2 wt. % Sodium dodecylbenzene-sulfonate[b] | Smooth surface, very few fish eyes, practically no pinholes. |
| 3 | 2 wt. % Sodium dodecylbenzene-sulfonate[b] + 1 wt. % oil[c] | Reasonably smooth surface, some fish eyes, few pinholes. |

[a]Triton-X-100 (Rohm & Haas).
[b]Conoco Sulfonic Acid 592 neutralized with NaOH.
[c]Unsulfonated white oil, boiling point range 613–833° F., 20+ carbon atoms per molecule (Witco Co. sulfonation process by-product oil.)
[d]Weight percents for the surfactants are based on the weight of the surfactant in the 60 parts by weight of aqueous solution of the surfactant.

The coating in run 3 was much better than the coating in run 1, but not as good as the coating in run 2. This demonstrates that while a mixture of sodium alkylbenzenesulfonates and unsulfonated white oil can be employed effectively to produce a satisfactory coating, the sodium alkylbenzenesulfonate which is at least substantially free of the unsulfonated white oil provides an even better coating.

Reasonable variations and modifications are possible within the scope of the foregoing disclosure and the appended claims to the invention.

That which is claimed is:

1. A composition comprising at least one poly(arylene sulfide) resin and at least one alkali metal alkylbenzenesulfonate.

2. A composition in accordance with claim 1 wherein said alkali metal alkylbenzenesulfonate is present in an amount in the range of about 0.01 to about 10 weight percent, based on the weight of said resin.

3. A composition in accordance with claim 2 wherein said alkali metal alkylbenzenesulfonate has the general formula:

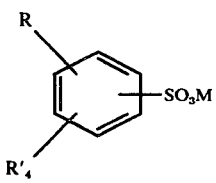

wherein M is an alkali metal, R is an alkyl radical having 6 to 30 carbon atoms, and each R' is individually selected from the group consisting of hydrogen and alkyl radicals having 1 to 18 carbon atoms.

4. A composition in accordance with claim 3 wherein at least 3 of the R' radicals are hydrogen.

5. A composition in accordance with claim 4 wherein said alkali metal is sodium.

6. A composition in accordance with claim 5 wherein said sodium alkylbenzenesulfonate is present in an amount in the range of about 0.1 to about 7 weight percent, based on the weight of said resin.

7. A composition in accordance with claim 6 wherein said resin is in particulate form, and further comprising a sufficient amount of a suitable liquid diluent to form a dispersion of the particles of said resin in said diluent, said suitable liquid diluent being inert to the other components of the dispersion and being readily volatilized during the curing of said resin.

8. A composition in accordance with claim 7 wherein said diluent is water.

9. A composition in accordance with claim 8 wherein said poly(arylene sulfide) resin is poly(phenylene sulfide).

10. A composition in accordance with claim 9 wherein said alkali metal alkylbenzenesulfonate is at least one sodium dodecylbenzenesulfonate.

11. A composition in accordance with claim 9 wherein said sodium alkylbenzenesulfonate is present in the form of a sodium petroleum sulfonate.

12. A composition in accordance with claim 1 wherein said resin is in particulate form, and further comprising a sufficient amount of a suitable liquid diluent to form a dispersion of the particles of said resin in said diluent, said suitable liquid diluent being inert to the other components of the dispersion and being readily volatilized during the curing of said resin.

13. A process of coating a substrate which comprises applying to a surface of said substrate a layer of the dispersion of claim 12, and then heating the thus applied layer in the presence of oxygen to a suitable temperature for a sufficient time to fuse and cure said poly(arylene sulfide) resin, said diluent being inert to said substrate and readily volatilized during said step of heating the thus applied layer, the concentration of the particles of said resin in said dispersion being sufficient for the particles to be closely enough associated on deposit on said substrate to permit the particles to fuse together on melting.

14. A process in accordance with claim 13 wherein said alkali metal alkylbenzenesulfonate is present in said dispersion in an amount in the range of about 0.01 to about 10 weight percent, based on the weight of said resin in said dispersion.

15. A process in accordance with claim 14 wherein said alkali metal alkylbenzenesulfonate has the general formula:

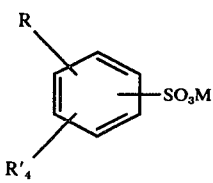

16. A process in accordance with claim 15 wherein said alkali metal is sodium, and wherein at least 3 of the R' radicals are hydrogen.

wherein M is an alkali metal, R is an alkyl radical having 6 to 30 carbon atoms, and each R' is individually selected from the group consisting of hydrogen and alkyl radicals having 1 to 18 carbon atoms.

17. A process in accordance with claim 16 wherein said sodium alkylbenzenesulfonate is present in said dispersion in an amount in the range of about 0.1 to about 7 weight percent, based on the weight of said resin in said dispersion.

18. A process in accordance with claim 17 wherein said diluent is water.

19. A process in accordance with claim 18 wherein said poly(arylene sulfide) resin is poly(phenylene sulfide).

20. An article of manufacture comprising a substrate having at least a portion of a surface of said substrate coated in accordance with the process of claim 13.

21. An article of manufacture in accordance with claim 20 wherein said alkali metal alkylbenzenesulfonate has the general formula:

$$\underset{R'_4}{\underset{R}{\bigcirc}}\!-\!SO_3M$$

wherein M is an alkali metal, R is an alkyl radical having 6 to 30 carbon atoms, and each R' is individually selected from the group consisting of hydrogen and alkyl radicals having 1 to 18 carbon atoms.

22. An article in accordance with claim 21 wherein said alkali metal alkylbenzenesulfonate is present in the coating in an amount in the range of about 0.01 to about 10 weight percent, based on the weight of said resin in said coating.

23. An article of manufacture in accordance with claim 22 wherein said poly(arylene sulfide) resin is poly(phenylene sulfide).

24. An article of manufacture in accordance with claim 23 wherein said alkali metal alkylbenzenesulfonate is at least one sodium dodecylbenzenesulfonate.

25. An article of manufacture in accordance with claim 23 wherein said sodium alkylbenzenesulfonate is present in the form of a sodium petroleum sulfonate.

26. A composition in accordance with claim 1 wherein said resin is in the form of particles having a size in the range of about 3 to about 150 microns, and further comprising a sufficient amount of a suitable liquid diluent to form a dispersion of the particles of said resin in said diluent, said suitable liquid diluent being inert to the other components of the dispersion and being readily volatilized during the curing of said resin, the concentration of said particles in said dispersion being in the range of about 10 to about 65 weight percent based on the weight of the total dispersion, and wherein said alkali metal alkylbenzenesulfonate is present in said dispersion in an amount in the range of about 0.01 to about 10 weight percent, based on the weight of said resin in said dispersion.

27. A process of coating a substrate which comprises applying to a surface of said substrate a layer of the dispersion of claim 26, and then heating the thus applied layer in the presence of oxygen to a suitable temperature for a sufficient time to fuse and cure said poly(arylene sulfide) resin, said diluent being inert to said substrate and readily volatilized during said step of heating the thus applied layer.

28. A process in accordance with claim 27 wherein said poly(arylene sulfide) resin is poly(phenylene sulfide), and wherein said alkali metal alkylbenzenesulfonate has the general formula:

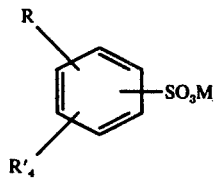

wherein M is an alkali metal, R is an alkyl radical having 6 to 30 carbon atoms, and each R' is individually selected from the group consisting of hydrogen and alkyl radicals having 1 to 18 carbon atoms.

29. A process in accordance with claim 28 wherein said alkali metal alkylbenzensulfonate is at least one sodium dodecylbenzenesulfonate.

30. A composition in accordance with claim 1 wherein said resin is in the form of particles having a size in the range of about 3 to about 150 microns, and further comprising a sufficient amount of water to form a dispersion of the particles of said resin in the water, the concentration of said particles in said dispersion being in the range of about 10 to about 65 weight percent based on the weight of the total dispersion, and wherein said alkali metal alkylbenzenesulfonate is present in said dispersion in an amount in the range of about 0.01 to about 10 weight percent, based on the weight of said resin in said dispersion.

31. A composition in accordance with claim 30 wherein said alkali metal alkylbenzenesulfonate is at least one sodium dodecylbenzenesulfonate.

* * * * *